United States Patent
Fraze (10) Patent No.: US 10,538,341 B1
(45) Date of Patent: Jan. 21, 2020

(54) SELF-MATING MODULAR SATELLITE BUS

(71) Applicant: Vector Launch, Inc., Tucson, AZ (US)

(72) Inventor: Raymond Edward Fraze, Hereford, AZ (US)

(73) Assignee: Vector Launch Inc., Tucson, AZ (US)

( * ) Notice: Subject to any disclaimer, the term of this patent is extended or adjusted under 35 U.S.C. 154(b) by 0 days.

(21) Appl. No.: 16/028,797

(22) Filed: Jul. 6, 2018

(51) Int. Cl.
| | |
|---|---|
| *B64G 1/10* | (2006.01) |
| *B64G 1/44* | (2006.01) |
| *B29C 70/42* | (2006.01) |
| *B33Y 10/00* | (2015.01) |
| *B29C 70/54* | (2006.01) |
| *B29C 64/10* | (2017.01) |
| *B29L 31/30* | (2006.01) |

(52) U.S. Cl.
CPC ................ *B64G 1/10* (2013.01); *B29C 64/10* (2017.08); *B29C 70/42* (2013.01); *B29C 70/54* (2013.01); *B33Y 10/00* (2014.12); *B64G 1/443* (2013.01); *B29L 2031/3097* (2013.01); *B64G 2001/1092* (2013.01)

(58) Field of Classification Search
CPC .............................................. B64G 2001/1092
See application file for complete search history.

(56) References Cited

U.S. PATENT DOCUMENTS

| | | | |
|---|---|---|---|
| 3,817,011 A | 6/1974 | Weed | |
| 4,397,434 A | 8/1983 | Farnham | |
| 5,199,672 A | 4/1993 | King et al. | |
| 5,314,146 A | 5/1994 | Chicoine et al. | |
| 5,411,226 A | 5/1995 | Jones et al. | |
| 5,613,653 A | 3/1997 | Bombled et al. | |
| 5,624,088 A * | 4/1997 | Fiore | B64G 1/10 244/158.1 |
| 5,720,450 A | 2/1998 | Kanne | |
| 5,779,195 A | 7/1998 | Basuthakur et al. | |
| 5,884,866 A | 3/1999 | Steinmeyer et al. | |
| 6,138,951 A | 10/2000 | Budris et al. | |
| 6,206,327 B1 | 3/2001 | Benedetti et al. | |

(Continued)

FOREIGN PATENT DOCUMENTS

WO    2017/069816 A1    4/2017

OTHER PUBLICATIONS

ETA hand2mind, "Building Congruent Hexagons," 5 pages, Mar. 24, 2018.

(Continued)

*Primary Examiner* — Richard G Davis (57) ABSTRACT

A self-mating modular satellite bus includes a plurality of side panels each having a front surface flanked by a first longitudinal edge and a second longitudinal edge, wherein the first longitudinal edge of each side panel is nested with the second longitudinal edge of an adjacent side panel. The longitudinal edges, when superimposed, form a joggle. A method of producing the modular satellite bus includes forming a plurality of the panels, aligning the first longitudinal edge of each side panel with the second longitudinal edge of an adjacent side panel, such that the first longitudinal edge of each side panel is nested with the second longitudinal edge of the adjacent side panel, and securing the first longitudinal edge of each side panel to the second longitudinal edge of the adjacent side panel.

7 Claims, 6 Drawing Sheets

(56) References Cited

U.S. PATENT DOCUMENTS

| | | | |
|---|---|---|---|
| 6,216,410 B1 * | 4/2001 | Haberman | E04B 1/02 |
| | | | 52/591.1 |
| 6,276,639 B1 | 8/2001 | Hornung et al. | |
| 6,296,206 B1 | 10/2001 | Chamness et al. | |
| 6,416,018 B2 | 7/2002 | DiVerde et al. | |
| 6,557,802 B2 | 5/2003 | Kroeker | |
| 8,366,053 B2 | 2/2013 | Watts | |
| 9,463,882 B1 | 10/2016 | Field et al. | |
| 9,708,080 B2 * | 7/2017 | Judd | B64G 1/10 |
| 2001/0004003 A1 | 6/2001 | Watanabe et al. | |
| 2006/0185277 A1 * | 8/2006 | Quincieu | B64G 1/10 |
| | | | 52/265 |
| 2014/0319283 A1 | 10/2014 | Holemans et al. | |
| 2016/0318635 A1 | 11/2016 | Field et al. | |
| 2017/0021948 A1 | 1/2017 | Yehezkel | |
| 2017/0327251 A1 | 11/2017 | Parissenti et al. | |

OTHER PUBLICATIONS

International Application No. PCT/US2018/046584, International Search Report & Written Opinion, 9 pages, Nov. 2, 2018.
International Application No. PCT/US2018/046588, International Search Report & Written Opinion, 8 pages, Nov. 2, 2018.
NASA, "Ames Modular Common Spacecraft Bus," 4 pages, Aug. 3, 2017.
Wikipedia, "Modular Common Spacecraft Bus," 3 pages, Mar. 11, 2018.

* cited by examiner

SELF-MATING MODULAR SATELLITE BUS

BACKGROUND

The structural bodies of orbital satellites, space-faring probes, and some spacecraft are typically handmade. These structural bodies, referred to herein as spacecraft buses, are normally machined, cut, bonded, or molded, using very labor-intensive techniques. Each resulting spacecraft bus is semi-custom. Due to the handmade nature of these items, portions of a spacecraft bus tend to be irregular, at least to some extent. Not only are spacecraft buses time-consuming to manufacture, but the cost is considerable as well. Furthermore, the resulting buses are not uniform.

CubeSats have been recently introduced and comprise satellite devices having a uniform, albeit small, size that allows for a more consistent manufacturing process. Nevertheless, the efficiency of CubeSat production can be improved. Moreover, the small size of CubeSats limits the quantity of internal components as well as the provided functionality.

Overview

A satellite bus, as described herein, includes a plurality of side panels each having a front surface flanked by a first longitudinal edge and a second longitudinal edge, wherein the first longitudinal edge of each side panel is nested with the second longitudinal edge of an adjacent side panel. The individual satellite panels may each include a first flange along the first longitudinal edge and a second flange along the second longitudinal edge, and the first flange superimposed on the second flange forms a joggle.

A method of producing a modular satellite bus may include forming a plurality of the side panels described above, aligning a first longitudinal edge of each side panel with a second longitudinal edge of an adjacent side panel, such that the first longitudinal edge of each side panel is nested with the second longitudinal edge of the adjacent side panel, and securing the first longitudinal edge of each side panel to the second longitudinal edge of the adjacent side panel.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
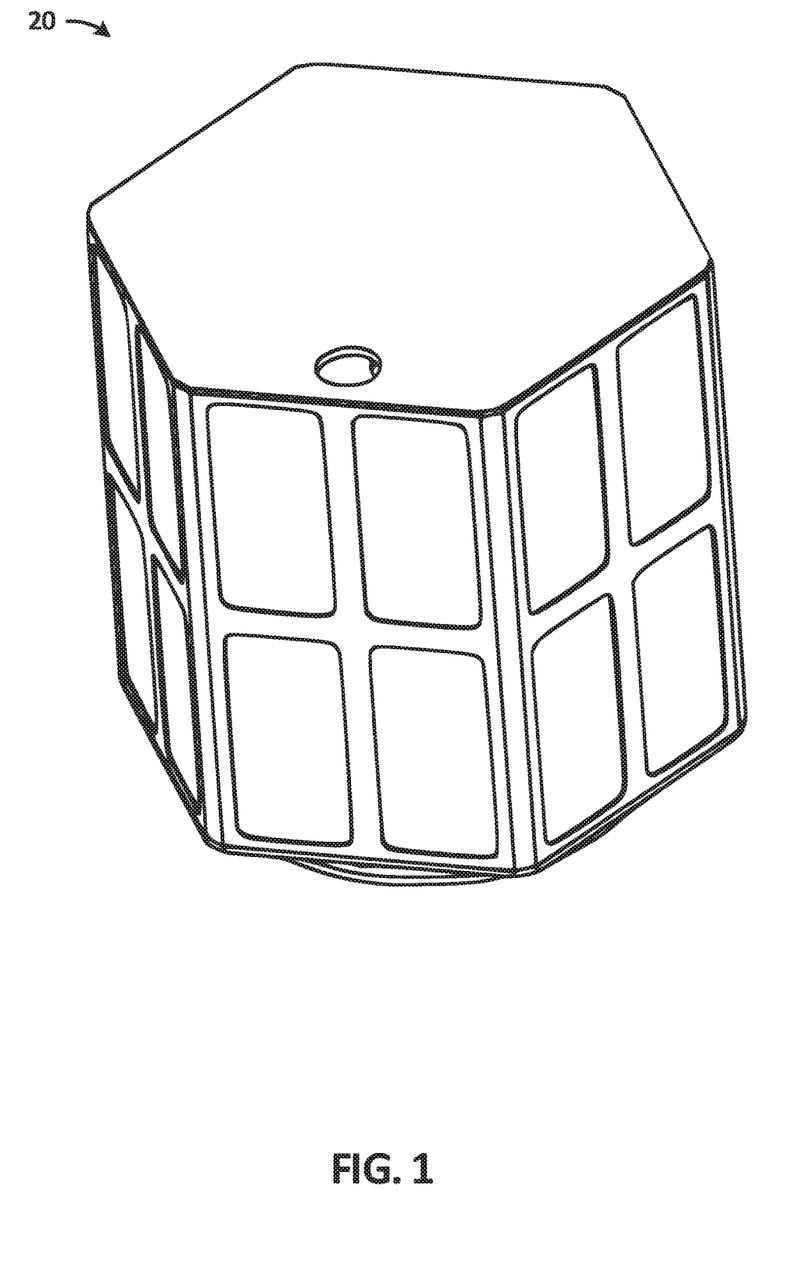
FIG. 1 is a perspective view of a self-mating modular satellite bus.

The satellite bus 20, as shown in FIG. 1, is the main structural component or framework of a satellite. The satellite bus 20 is self-mating in the sense that each of the side panels of the satellite bus fit together without requiring additional support materials. Self-mating can also be referred to herein as self-jigging. Fasteners or adhesives may be used to secure the side panels to one another, but no additional framework materials are required to build the satellite bus 20.

Figure 2:
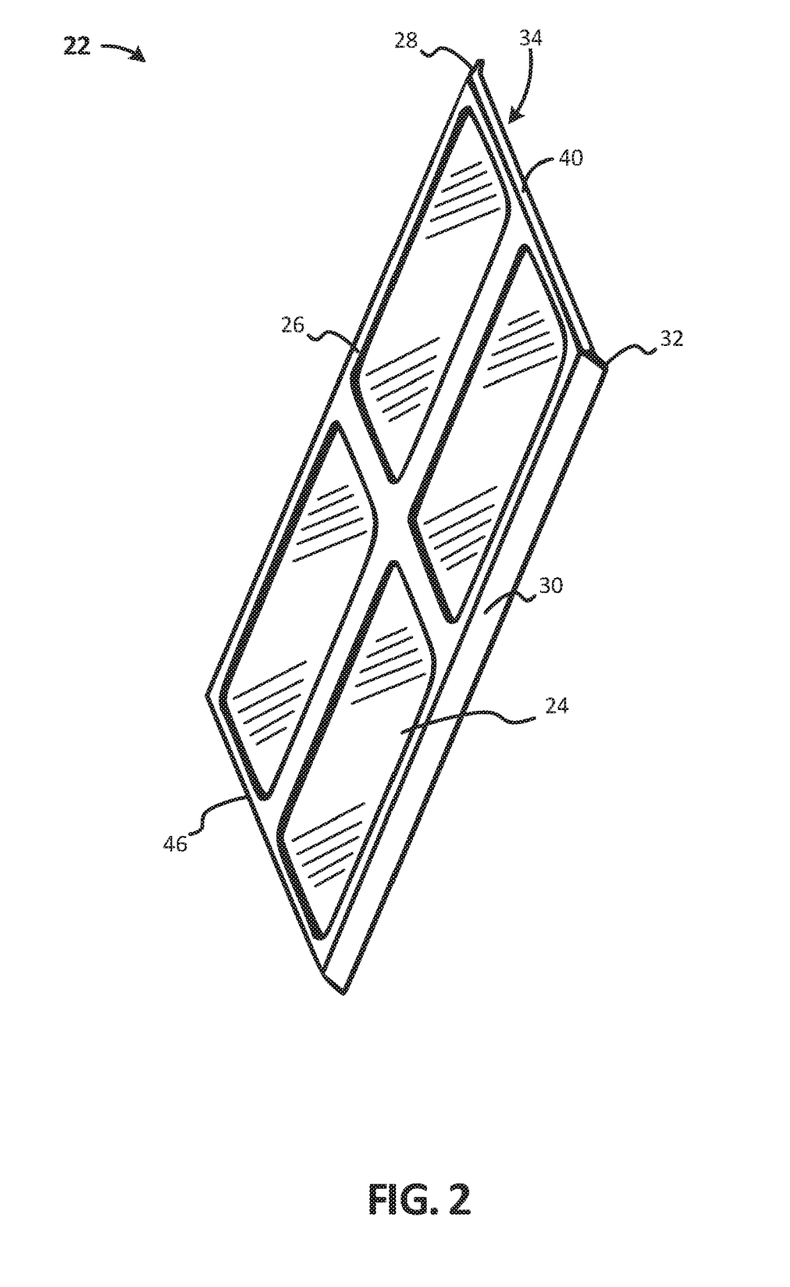
FIG. 2 is a perspective view of a single side panel of the satellite bus.

A side panel 22 of the satellite bus 20 is shown in FIG. 2. The satellite bus 20 is modular in the sense that each side panel 22 is a standardized part that can be formed from a single die or mold, such that each side panel 22 is virtually identical to the other side panels.

Figures 3A, 3B:
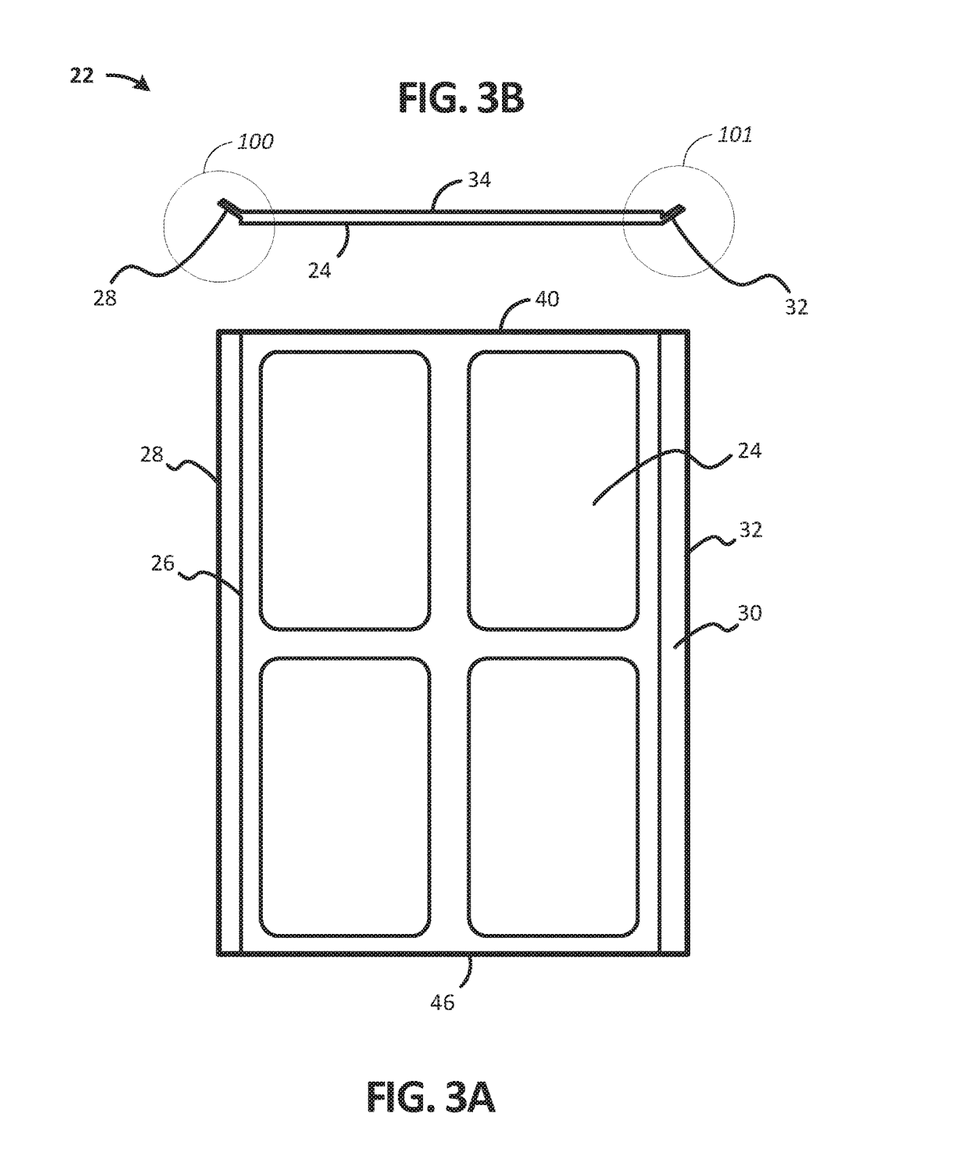
FIG. 3A is a front view of the side panel of the satellite bus.
FIG. 3B is a top view of the side panel in FIG. 3A.

A front surface 24 of the side panel 22 is shown in FIG. 3A. The front surface 24 is flanked by a first longitudinal edge 26 and a second longitudinal edge 30. When the side panels 22 are arranged to form the satellite bus 20, the first longitudinal edge 26 of each side panel 22 is nested with the second longitudinal edge 30 of an adjacent side panel.

FIG. 3B is a top view of the side panel 22 shown in FIG. 3A, illustrating one example of the modular side panel 22 that can be nested with adjacent panels. As shown in FIG. 3B, the first longitudinal edge 26 has a first flange 28 and the second longitudinal edge 30 has a second flange 32. The first flange 28 superimposed on the second flange 32 together form a joggle, such that the first and second flanges 28 and 32 nest or fit together. The nesting or fit of first and second flanges 28 and 32 is due to the associated geometric configuration.

Figure 3C:
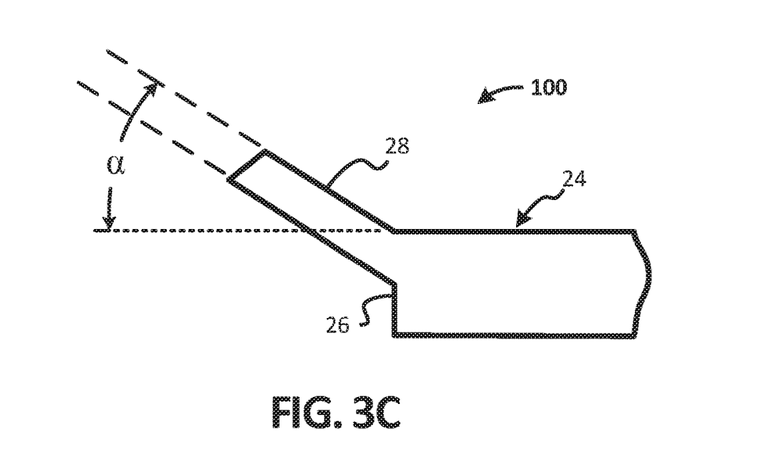
FIGS. 3C and 3D are close-up views of the side panel indicated in FIG. 3B.
Figure 3D:
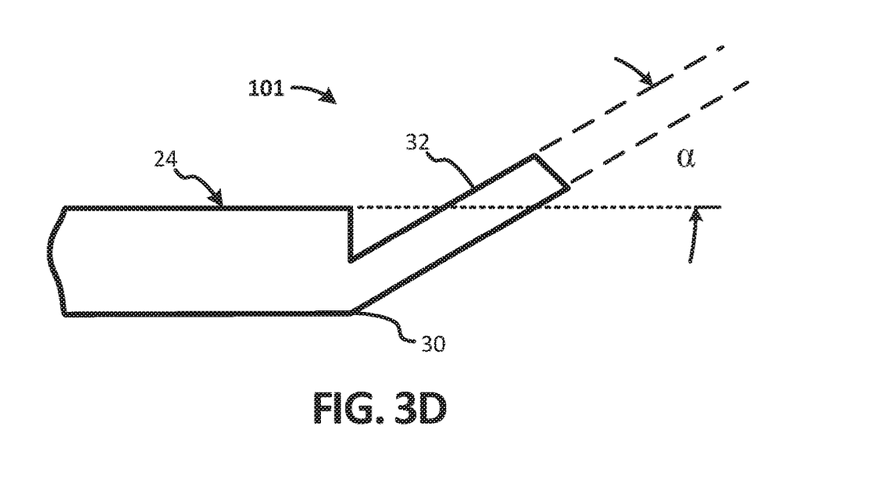

FIGS. 3C and 3D are close-up views of the side panel 22, particularly the flanges 28, 32, indicated in FIG. 3B. In this particular example, each flange 28, 32 is an angled extension of the respective longitudinal edge 26, 30, with each flange 28, 32 forming the same angle α with the front surface 24, but slightly offset with respect to one another. More particularly, the flanges 28, 32 are offset, with the first flange 28 set back from the front surface 24 and the second flange 32 set back from a back surface 34 of the side panel 22. The offset front-and-back spacing of the flanges 28, 32 allows the flanges 28, 32 of adjacent side panels 22 to nest together to form a joggle. The flanges 28, 32 may be straight as shown in FIGS. 3B, 3C, and 3D, or they may be stepped with complementary stepping or reverse bends that nest to form a joggle, or they may include any other complementary shaping that nests to form a joggle. A joggle, as referred to herein, is a joint between two adjacent pieces/panels. The joggles herein are formed from a projection of a first panel fitting into a notch of a second panel, and vice-versa.

The first longitudinal edge 26 of each side panel 22 may be secured to the second longitudinal edge 30 of the adjacent side panel 22 using any suitable means. In certain configurations the application of pressure may be sufficient to secure the first and second longitudinal edges 26, 30 together. For example, according to some examples, the first flange 28 may include one or more projections or teeth that fit into one or more recesses or notches in the second flange 32 to prevent slipping. Alternatively, the first and second flanges 28, 30 may form other types of complementary snap or pressure-induced connections.

A glue or adhesive is another option for securing the first and second longitudinal edges 26, 30 to one another. Examples of suitable adhesives include various epoxies (e.g. single, dual, or multi-component epoxies), cyanoacrylate, acrylic adhesives, urethane adhesives, or other suitable adhesives. The adhesive can be selected based on the application of the final assembly, such as space-based applications, high-ultraviolet (UV) exposure applications, low-temperature conditions, or other applications. The adhesive can be applied to a surface of one or both flanges 28, 32 that comes into contact with the other flange 32, 28. Various surface preparation might occur prior to application of adhesive, such as abrasive preparation, cleaning, solvent application, or other preparation.

Once adhesive has been applied between two adjacent panels via first and second longitudinal edges 26, 30, then further panels can be bonded to the existing panels. A similar adhesive-based process can be used to adhere further panels together to form a hex shape or other corresponding geometric shape based on selection of the angle α. Clamps, belts, vises, or other mechanisms can be used to hold a desired shape or ensure structural integrity of the assembled panels until the adhesive has been cured or dried. Further curing processes can be employed, such as heat, pressure, vacuum, UV exposure, or other curing techniques.

Another technique for securing the first and second longitudinal edges 26, 30 together is the use of fasteners. For example, screws or bolts and corresponding nuts, or rivets, or any other suitable mechanical fastener could be used. Clamps or spring-form fasteners might instead be employed. Alternatively, the first and second longitudinal edges 26, 30 could be welded together.

The satellite bus 20 may include any suitable number of side panels 22. As shown in FIG. 1, the satellite bus 20 may include six side panels 22 forming a hexagon. When the satellite bus 20 is in the form of a hexagon, the angle α between the front surface 24 of each side panel 22 and flange 28, 32 is 30°. The hexagon shape is efficient for fitting into a void created by a round nose cone of a rocket. Alternatively, the satellite bus 20 may include four side panels 22 forming a square with an angle α of 45° between the front surface 24 of each side panel 22 and flange 28, 32. When the satellite bus 20 includes five side panels 22 forming a pentagon, the angle α is 36° between the front surface 24 of each side panel 22 and flange 28, 32. When the satellite bus 20 includes seven side panels 22 forming a heptagon, the angle α is 25.7° between the front surface 24 of each side panel 22 and flange 28, 32. When the satellite bus 20 includes eight side panels 22 forming an octagon, the angle α is 22.5° between the front surface 24 of each side panel 22 and flange 28, 32. Each shape can be selected based on application, launch platform restrictions, weight requirements, payload enclosure requirements, or other application requirements. In other examples, the shape and angle α can be selected to best suit on-board components of the satellite bus, such as solar panels, communication antennas, imaging sensors, propulsion components, inertial adjustment components, or other components.

Figures 4A, 4B, 4C, 4D:
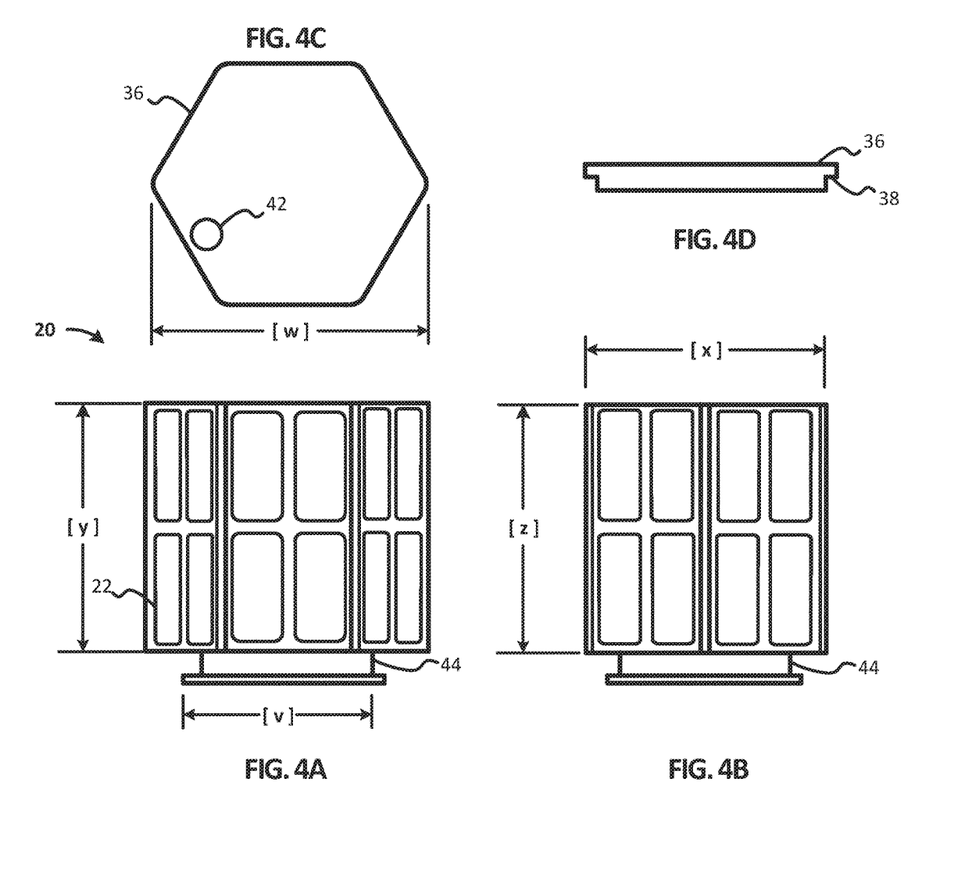
FIG. 4A is a front view of the satellite bus in FIG. 1.
FIG. 4B is another front view of the satellite bus in FIG. 1 rotated 30° from the view in FIG. 4A.
FIG. 4C is a top view of the satellite bus in FIG. 4A.
FIG. 4D is a side view of a top panel of the satellite bus in FIG. 4A.

FIGS. 4A-4D show various views of the satellite bus 20 illustrated in FIG. 1. FIG. 4A shows a front view of the satellite bus 20. FIG. 4B shows another front view of the satellite bus 20 rotated approximately 30° from the view in FIG. 4A. The satellite bus 20 may include a top panel 36, best viewed in FIG. 4C, having a flange 38 that attaches the top panel 36 to each of the side panels 22 along a top edge 40 of each side panel 22. Specifically, the flange 38 on the top panel 36 forms a 90° angle with the top edge 40 of each side panel 22. FIG. 4D shows a side view of the top panel 36 separate from the satellite bus 20, specifically showing the flange 38. The top panel 36 can be attached to the top edges 40 of the side panels 22 using any of the techniques described above for securing adjacent side panels 22 to one another. For example, the top panel 36 can be secured to the top edges 40 of the side panels 22 using pressure, adhesive, and/or fasteners. Top panel 36 and side panels 22 might also have corresponding joggle features to create bonding surfaces between top panel 36 and side panels 22. The top panel 36 may include one or more apertures 42, which may be used to accommodate an imaging component, such as a camera or for tracking stars, or for any other purpose.

The satellite bus 20 may also include a bottom panel 44, shown in FIGS. 4A and 4B. Like the top panel 36, the bottom panel 44 may also include a flange (not shown) that attaches the bottom panel 44 to each of the side panels 22 along a bottom edge 46 of each side panel 22. Much like the configuration of the flange 38 on the top panel 36, the flange on the base forms a 90° angle with the bottom edge 46 of each side panel 22. The bottom panel 44 can be attached to the bottom edges 46 of the side panels 22 using any of the techniques described above for securing the top panel 36 to the top edges 40 of the side panels 22, such as using pressure, adhesive, and/or fasteners. Bottom panel 44 and side panels 22 might also have corresponding joggle features to create bonding surfaces between bottom panel 44 and side panels 22. The bottom panel 44 may include an adapter, such as another flange, for mounting the satellite to a rocket stage or deployer.

The bottom panel 44 may include one or more apertures to support propulsion components. These propulsion components can include external nozzles, engines, grids, electrodes, or other suitable propulsion extensions from satellite bus 20. A lower chamber might be formed using a corresponding internal deck 28 to separate propulsion components from avionics, power, and sensing components.

Overall, the satellite bus 20 may be comparable in size to a CubeSat form factor, or the satellite bus 20 may be larger or smaller than a CubeSat. Consequently, the satellite bus 20 may be launched in similar types of rockets used to launch CubeSats. In particular, the satellite bus 20 may have an overall height (y, z), 40 cm, depicted in FIG. 4B, between about 35 cm and about 45 cm, or between about 20 cm and about 35 cm, or between about 45 cm and about 75 cm. The individual side panels 22 may have a height (y, z), 40 cm, depicted in FIG. 4A, between about 30 cm and about 45 cm, or between about 20 cm and about 35 cm, or between about 45 cm and about 75 cm. The satellite bus 20 may have a diameter (w), 45.7 cm, depicted in FIG. 4C, between about 350 cm and about 45.7 cm, or between about 45.7 cm and about 75 cm, or between about 75 cm and about 100 cm. The satellite bus 20, on its own, may weigh between about 500 grams and about 1000 grams, or between about 750 grams and about 1500 grams, or between about 1500 grams and about 6000 grams. It should be understood that satellite bus 60 can have other dimensions and weights.

Figure 5:
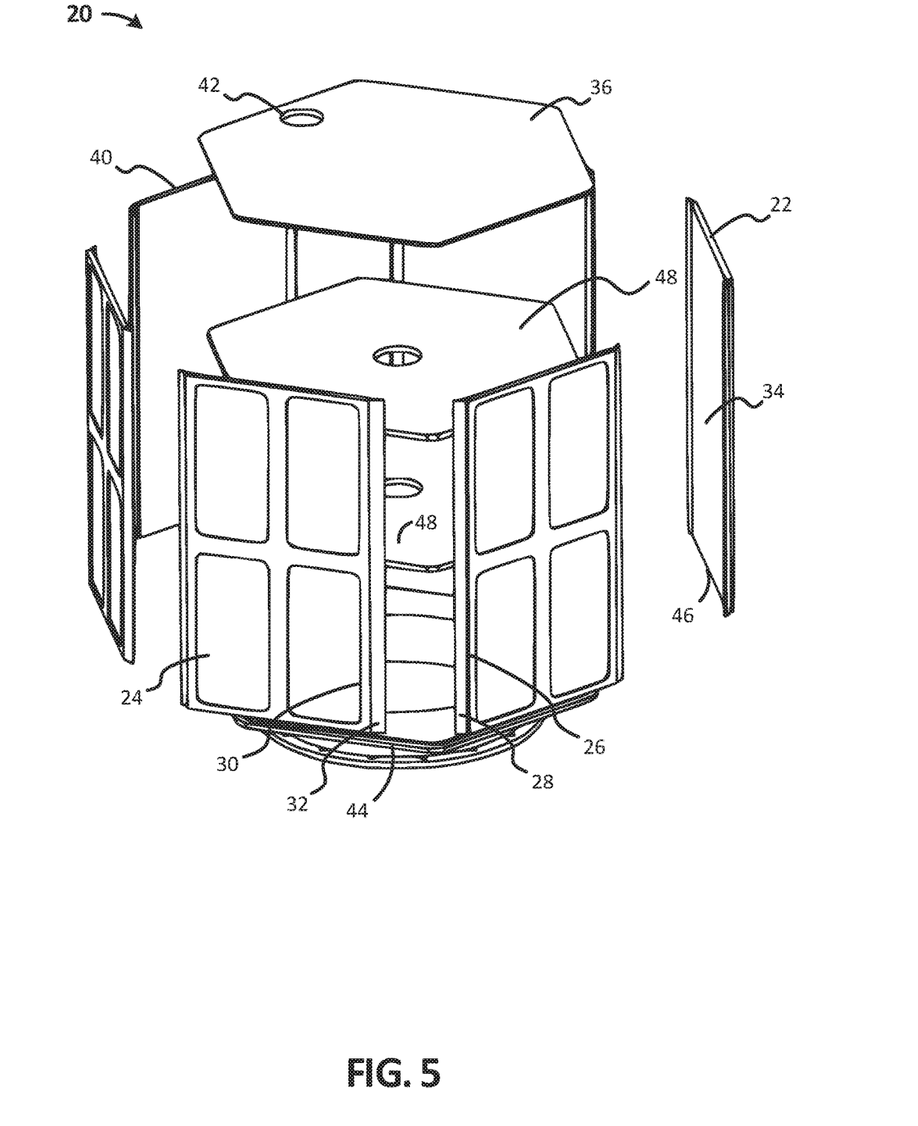
FIG. 5 is an exploded view of a self-mating modular satellite bus.

The satellite bus 20 may either be hollow to house a single chamber of internal components, or the satellite bus may include one or more decks 48 or other externals, as shown in FIG. 5 to house more than one chamber of internal components. Each of the side panels 22 may have one or more molded features formed into the back surface 34 facing the inside of the satellite bus 20. The molded features may be designed to hold one or more decks 48 or other externals in place. The molded features may include one or more tabs, fasteners, bonded areas, embossments, or shelves, either for securing a deck 48 or for any other purpose.

The deck 48 may be a propulsion deck or an avionics deck, for example. The avionics deck may include a sun sensor, a star tracker, radio frequency (RF) transceivers, optical transceivers, reaction wheels, wire harnesses, power bus, internal heat radiator connections, and/or any other avionics features. The deck 48 can be attached to the back surface 34 of each of the side panels 22 using any of the aforementioned features on the back surfaces 34 of the side panels 22. The satellite bus 20 may also include internal heat radiator connections, such as one or more thermal straps, secured to the inside of the satellite bus 20 to conduct heat from inside the satellite to the exterior of the satellite through one or more apertures in side panels 22, top panel 36, or bottom panel 44.

According to certain examples, each of the side panels 22 may have a mounting flange on the front surface 24. The mounting flange can be used to attach a solar panel or a window to the front surface 24 of the respective side panel 22. Using a flange to mount the solar panels or windows results in fewer layers in the satellite bus 20, thereby reducing the overall weight of the satellite bus 20.

One of the advantages of the satellite bus 20 is that the design is modular, so the structure is formed by panels, namely side panels 22, a top panel, and a bottom panel 44. The side panels 22 can all be formed from the same manufacturing die. The side panels 22 can have predetermined features to hold decks and other equipment, in accordance with a user's specifications. The predetermined features may be obtained either by using a single die that includes the desired features for each of the side panels 22, or by modifying a single die to include, for example, a molded feature, tabs, fasteners, bonded areas, embossments, or shelves. Consequently, the satellite bus 20 can be made available as a kit and assembled by a user. Alternatively, the satellite bus 20 can be manufactured according to user specifications, in modular form, and subsequently transferred to the user for final assembly. The internal features of the satellite may be pre-assembled and mounted inside the satellite bus 20 before either the user or the manufacturer seals the satellite bus 20 using associated joggles and flanges, thereby forming a satellite.

A method of producing the modular satellite bus 20 includes forming the side panels 22, which may be achieved using a die or a set of male and female dies, or any other suitable casting or molding process. More particularly, the die can be filled with a composite material, such as laser-cut carbon, pre-impregnated fiberglass, carbon, resin, and combinations thereof. The die can then be compressed, using a jig, belts, hydraulic press, or any other suitable pressure-inducing device, to form at least one compressed composite structure in the shape of a side panel 22. After the material has been compressed in the die, any excess material extending from the die can be trimmed. Depending on the material used, it may be necessary or at least beneficial to heat or otherwise cure the resulting side panel 22 either before or after removing the side panel 22 from the die. Vacuum chambers might be employed during formation of side panels to ensure desired curing of the associated composite material. Other manufacturing techniques may be used to form the side panels 22 as well, such as additive manufacturing or 3D printing.

As described above, the satellite bus 20 may have any reasonable number of side panels 22, such as four, five, six, seven, or eight. Each side panel 22 can be formed in the same manner using the same die, such that all of the resulting side panels 22 in any satellite bus 20 are identical.

Another advantage of the satellite bus 20 design is that only a simple modification of the process is needed to vary the number of side panels 22 in a resulting satellite bus 20. As described above, the side panels 22 joined together have an angle between them, which is two times the angle α between the front surface 24 of each side panel 22 and flange 28, 32. This angle α varies with the number of side panels 22 in the satellite bus 20. By simply changing the angle α in the die or during additive manufacturing or other process used to form the side panels 22, essentially any polygonal shape of satellite bus 20 can be formed. Thus, the same die, albeit with modified flange or joggle angles α, can be used to form satellite buses 20 of virtually any polygonal shape.

In order to form a square satellite bus 20 having four side panels 22, the flange or joggle angle α can be set at 45° between the front surface 24 of each side panel 22 and flange 28, 32. In order to form a pentagonal satellite bus 20 having five side panels 22, the flange or joggle angle α can be set at 36° between the front surface 24 of each side panel 22 and flange 28, 32. In order to form a hexagonal satellite bus 20 having six side panels 22, the flange or joggle angle α can be set at 30° between the front surface 24 of each side panel 22 and flange 28, 32. In order to form a heptagonal satellite bus 20 having seven side panels 22, the flange or joggle angle α can be set at 25.7° between the front surface 24 of each side panel 22 and flange 28, 32. In order to form an octagonal satellite bus 20 having eight side panels 22, the flange or joggle angle α can be set at 22.5° between the front surface 24 of each side panel 22 and flange 28, 32.

The top panel 36 and the bottom panel 44 can each be formed according to the same processes as the side panels 22, such as die-forming or additive manufacturing. One or more holes or apertures may be stamped into the top panel 36, the bottom panel 44, and/or the side panels 22 for various reasons, such as to accommodate propulsion components, sensors, cameras, solar arrays, antennas, star trackers, and the like.

Additionally, one or more molded features may be formed into the back surface 34 of each of the side panels 22. These features may be designed to hold one or more decks 48 or other externals in place inside the satellite bus 20. For example, one or more tabs, fasteners, bonded areas, embossments, or shelves may be molded into or attached to the back surface 34 of each side panel 22.

Furthermore, a mounting flange may be molded into or otherwise attached to the front surface 24 of each of the side panels 22. The mounting flange can be used to attach a solar panel or a window to the front surface 24 of the respective side panel 22, which may be done either before or after the side panels 22 are secured to one another.

Once each of the side panels 22 for a particular satellite bus 20 has been formed, the side panels 22 can be aligned with the first longitudinal edge 26 of each side panel 22 aligned with the second longitudinal edge 30 of an adjacent side panel, such that the first longitudinal edge 26 of each side panel 22 is nested with the second longitudinal edge 30 of the adjacent side panel. In certain examples, the first and second longitudinal edges 26, 30 may snap or otherwise fasten together. In any case, various mechanisms, such as clamps or belts, may be used to hold the side panels 22 in place while securing the side panels 22 to one another. However, side panels 22 are self-jigging in that each side panel nests into one or more adjacent side panels without additional tooling or jigs. As described above, the first and second longitudinal edges 26, 30 can be secured to one another either by snapping together using pressure, or using one or more fasteners, or by applying an adhesive to the flanges 38, 32 along the longitudinal edges 26, 30.

Any internal features of the satellite may be manufactured separately, pre-assembled, and mounted inside the satellite bus 20, particularly using the features that are molded or attached to the back surface 34 of each of the side panels 22 to secure the internal features in place, during assembly of the satellite bus 20. Such internal features may include, for example, one or more decks 48, such as a propulsion deck or an avionics deck, and corresponding features of the decks, such as a sun sensor, a star tracker, a radio, reaction wheels, and/or a wire harness. One or more thermal straps may also be secured to the inside of the satellite bus 20 during assembly.

After the side panels 22 are secured to one another, the top panel 36 can be attached to each of the side panels 22 along the top edge 40 of each side panel 22. Also, the bottom panel 44 can be attached to each of the side panels 22 along the bottom edge 46 of each side panel 22.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above can be combined in various ways to form multiple embodiments. As a result, the invention is not limited to the specific embodiments described above, but only by the claims and their equivalents.

What is claimed is:

1. A satellite bus comprising:
    a plurality of side panels arranged into a hexagonal arrangement by at least nesting flanged longitudinal edges of each side panel into flanged longitudinal edges of adjacent side panels;
    each of the plurality of side panels comprising a compressed composite material forming a front surface flanked by a first longitudinal edge and a second longitudinal edge;
    the first longitudinal edge of each side panel comprising a flange forming an angle with the front surface;
    the second longitudinal edge of each side panel comprising a flange forming an angle with the front surface; and
    wherein a surface of the flange along the first longitudinal edge of each side panel nests with a surface of the flange along the second longitudinal edge of the adjacent side panel to form a joggle.

2. The satellite bus of claim 1, comprising:
    adhesive material disposed along at least a portion of the first longitudinal edge or second longitudinal edge of ones of the plurality of side panels and configured to secure the plurality of side panels arranged into the hexagonal arrangement.

3. The satellite bus of claim 1, wherein the first longitudinal edge of each side panel has a projection having 30 degree angle with the front surface that can fit into a recess having a 30 degree angle with the front surface of the second longitudinal edge of the adjacent side panel.

4. The satellite bus of claim 1, further comprising a top panel having a flange that attaches the top panel at 90 degrees to each of the side panels along mating surfaces on a top edge of each side panel, wherein the top panel comprises the compressed composite material.

5. The satellite bus of claim 4, further comprising a base having a flange that attaches the base at 90 degrees to each of the side panels along mating surfaces on a bottom edge of each side panel, wherein the bottom panel comprises the compressed composite material.

6. The satellite bus of claim 1, wherein each side panel has a back surface opposite the front surface, and the back surface includes a molded feature formed into the compressed composite material to hold at least one deck internal to the satellite bus when formed into the hexagonal arrangement.

7. A satellite comprising the satellite bus of claim 1.

* * * * *